Patented June 23, 1942

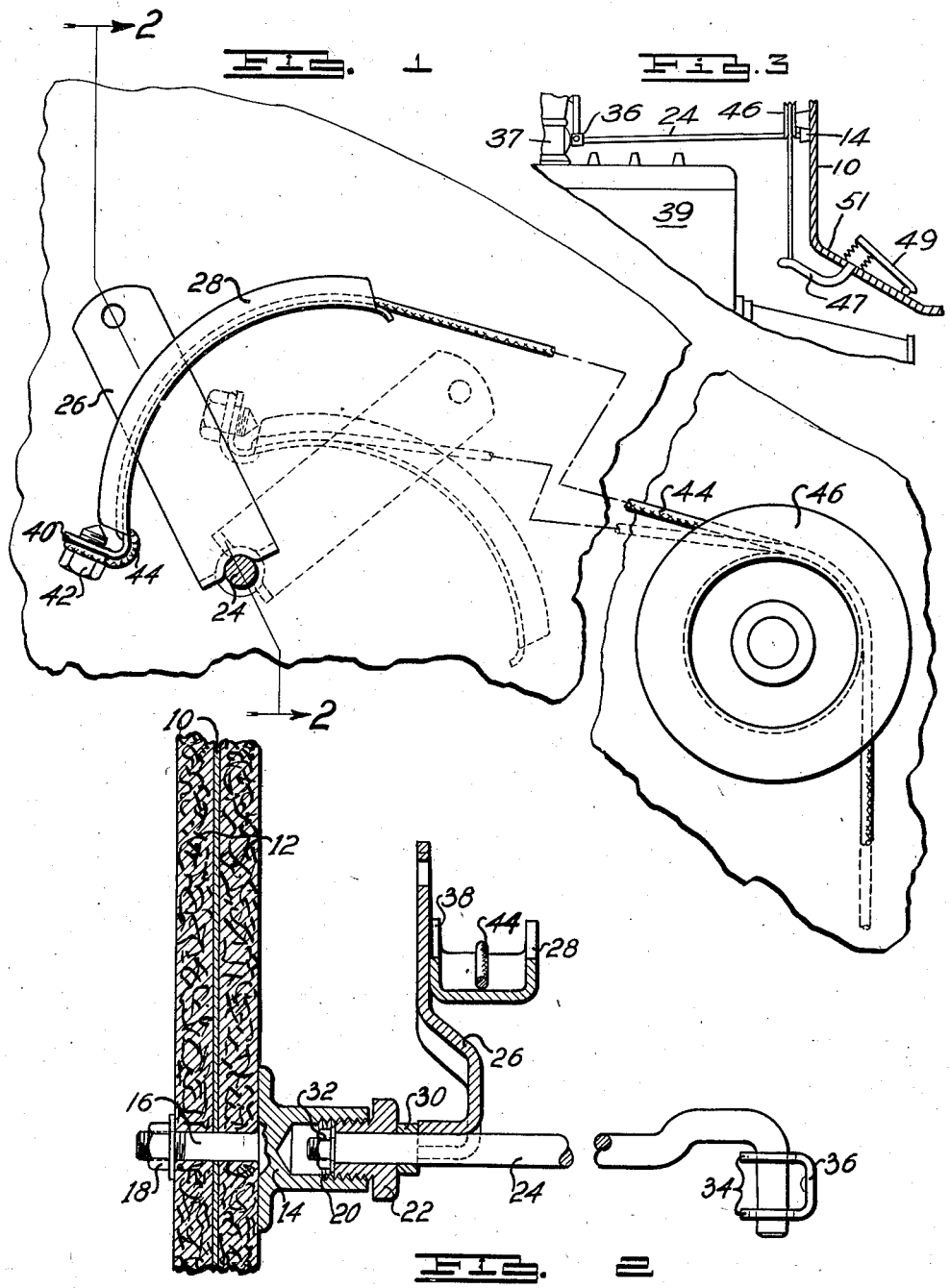

2,287,704

UNITED STATES PATENT OFFICE 2,287,704

ACCELERATOR CONTROL

John O. Oberg, Kenosha, Wis., assignor to Nash-Kelvinator Corporation, Kenosha, Wis., a corporation of Maryland Application January 27, 1941, Serial No. 376,101

5 Claims. (Cl. 74—513)

This invention relates to an accelerator control and has particular reference to means for connecting the accelerator pedal of an automobile to the throttle of the automobile by means of a cable in such a manner as to smoothly accelerate the speed of the automobile when the accelerator pedal is depressed.

It is an object of this invention to provide means for connecting the throttle of an automobile to the accelerator pedal by means of a cable so that the initial movement in depressing the pedal will produce relatively less movement of the throttle than will later increments of movement of the pedal.

It is another object of this invention to provide means for connecting the accelerator pedal of an automobile to the throttle of the automobile in such a way that a sudden movement of the accelerator pedal will not cause the throttle to be suddenly opened.

Other objects and advantages of this invention will be apparent from a consideration of the following description and claims and the attached drawing, of which there is one sheet, and in which—

Figure 1 represents a front elevation of the dash panel of an automobile as viewed from the motor compartment;

Figure 2 represents a sectional view taken along a plane indicated by the broken line 2—2 in Figure 1; and Figure 3 represents a side elevation of the throttle control mechanism as connected between the accelerator pedal and carburetor of an automobile.

The structure disclosed is similar to that disclosed and claimed in the co-pending application of Robert Stortz, Serial No. 351,928, filed August 9, 1940, and the invention involved in this application constitutes an improved in the structure illustrated in that application.

The drawing illustrates the dash panel 10 of an automobile which may be covered on each side by pads of heat and sound insulating material 12 (see Figure 2). A socket member 14 is provided with an integral pin portion 16 which extends through the dash panel 10 and the insulating material 12 and is secured in place by a nut and washer at 18. The socket member 14 is provided with an internally threaded aperture 20 within which the externally threaded plug 22 is rotatably received. The plug 22 is provided with a central aperture through which extends the end of a throttle shaft 24. Secured as by welding to the throttle shaft 24 forwardly of the plug 22 in an arm 26 which carries an arcuate ramp 28. A spacing washer 30 is positioned between the end of the arm 26 and the plug 22 and the shaft 24 is secured to the plug by means of a nut 32 threaded on the end of the shaft before the plug 22 is threaded into the socket member 14. The forward end of the throttle shaft 24 extends forwardly from the dash panel 10 and is bent over and inserted through the U-shaped arms 34 of a bracket 36 which is secured to the throttle valve of a carburetor. The carburetor 37 is shown mounted on the top of an internal combustion motor (see Figure 3).

The ramp 28 is generally channel shaped in cross section, having an inner flange 38 which is welded or otherwise suitably secured to the arm 26. One end of the webbed portion of the ramp 28 is bent upwardly to form a stop 40 which is pierced to receive the metal screw 42 by means of which the end of a throttle cable 44 is secured to the ramp. The cable 44 extends upwardly through a hole in the webbed portion of the ramp and then along the surface of the ramp from which it extends to a pulley 46 pivotally supported on the dash panel 10. The cable 44 is directed around the pulley 46 and downwardly to an accelerator pedal 47, the selectively operable portion 49 of the accelerator being mounted on top of the toe board 51 which is connected to the lower edge of the dash panel 10.

Attention is particularly called to the fact that the arcuate ramp 28 is not concentric with respect to the center of the throttle shaft 24. The front of the ramp from which the cable 44 extends to the pulley 46 is furthest removed from the shaft 24 while the end of the ramp 28 to which the cable is attached is closest to the shaft 24. Initial movement of the cable 44 while the ramp 28 is in a position corresponding to the closed position of the throttle, illustrated by the full lines in Figure 1, will act tangentially along the ramp at its greatest radial distance from the shaft 24 and will result in limited angular movement of the shaft. As movement of the cable and ramp continues, the cable will unroll along the ramp and act tangentially along the ramp at points successively closer to the shaft 24 (see the position of the cable and ramp shown by the dotted lines in Figure 1). Each successive increment of movement of the cable will result in successively greater increments of angular movement of the shaft.

It should therefore be obvious that the first unit movement of the cable 44 will cause less angular displacement of the throttle than will later unit movements of the cable 44. The result of this construction of the ramp 28 is that the first movement of the accelerator pedal will open the throttle at a slower rate than will later movement of the accelerator pedal; thus if the accelerator pedal is suddenly moved to its fully depressed position, the throttle will at first be opened slowly and then at a more rapid rate as the eccentric ramp 28 is swung around the shaft 24. This prevents a too sudden opening of the throttle which is liable to flood the motor and result in jerky operation of the automobile.

While I have described my invention in some detail, I intend this description to be an example only and not as a limitation of my invention, to which I make the following claims:

1. In a throttle control device, a shaft rotatably supported for opening said throttle, an arm secured to said shaft and extending radially therefrom, an arcuate ramp secured to said arm and eccentrically with respect to said shaft, a cable extending over said ramp and secured to one end thereof, and an accelerator pedal, the other end of said cable being secured to said pedal.

2. A throttle control mechanism comprising a rotatable member for operating said throttle, said rotatable member having an arcuate surface formed thereon eccentrically with respect to the axis of rotation of said member, a cable secured to said rotatable member and extending over said arcuate surface, and an accelerator pedal, said cable being secured to said pedal.

3. A throttle control mechanism comprising a rotatable member connected to said throttle, an arcuate surface formed on said rotatable member eccentrically with respect to the axis of rotation of said member, a stop formed on said arcuate surface at a point nearest the axis of rotation of said rotatable member, and a cable secured to said stop and extending tangentially from said arcuate surface at the point of greatest eccentricity of said surface from said rotatable member when said member is in a position corresponding to the closed position of said throttle.

4. A throttle control mechanism comprising an accelerator pedal, a cable having one end connected to said accelerator pedal, a shaft rotatably supported for controlling said throttle, said cable being arranged to rotate said shaft, and a ramp having an arcuate surface rotatably supported about a point eccentric with respect to the center of curvature of said arcuate surface, said cable being passed over said ramp and extending longitudinally therefrom at the point of maximum eccentricity of said surface when said shaft and ramp are in a position corresponding to the closed position of the throttle.

5. In combination with a throttle and a control member therefor, a rotatable shaft arranged to open and close said throttle, a lever secured to said shaft and having an arcuate surface eccentric with respect to the axis of said shaft, and a cable secured to said lever and connected to said control member for movement by said member, said cable passing over said surface and extending tangentially therefrom at the point of maximum eccentricity of said surface when said shaft and lever are in a position corresponding to the closed position of said throttle.

JOHN O. OBERG.